US010053156B2

(12) United States Patent
Daigaku

(10) Patent No.: US 10,053,156 B2
(45) Date of Patent: Aug. 21, 2018

(54) VEHICLE FRONT PORTION STRUCTURE

(71) Applicant: TOYOTA JIDOSHA KABUSHIKI KAISHA, Toyota-shi (JP)

(72) Inventor: Koichi Daigaku, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/090,230

(22) Filed: Apr. 4, 2016

(65) Prior Publication Data

US 2017/0050676 A1    Feb. 23, 2017

(30) Foreign Application Priority Data

Aug. 18, 2015    (JP) ................... 2015-161210

(51) Int. Cl.
 *B62D 21/15*    (2006.01)
 *B62D 25/08*    (2006.01)
(52) U.S. Cl.
 CPC ......... *B62D 25/082* (2013.01); *B62D 21/155* (2013.01)
(58) Field of Classification Search
 CPC .................................................. B62D 21/155
 USPC .......... 296/203.01, 203.02, 193.09; 293/155; 180/68.4, 312
 See application file for complete search history.

(56) References Cited

U.S. PATENT DOCUMENTS

| 2,071,328 | A | * | 2/1937 | Broulhiet | ............. | B62D 25/163 |
| | | | | | | 180/68.4 |
| 6,880,663 | B2 | * | 4/2005 | Fujiki | ................. | B62D 21/155 |
| | | | | | | 180/232 |
| 7,520,514 | B2 | * | 4/2009 | Ogawa | ..................... | B60G 3/20 |
| | | | | | | 180/312 |
| 2002/0166711 | A1 | * | 11/2002 | Witherspoon | ......... | B60N 2/002 |
| | | | | | | 180/282 |
| 2007/0169982 | A1 | * | 7/2007 | Ogawa | ..................... | B60G 3/20 |
| | | | | | | 180/312 |
| 2011/0316295 | A1 | | 12/2011 | Yamada et al. | | |
| 2013/0161979 | A1 | * | 6/2013 | Abe | ....................... | B62D 25/08 |
| | | | | | | 296/193.09 |

(Continued)

FOREIGN PATENT DOCUMENTS

| EP | 2810854 | A1 | * | 12/2014 | ........... | B62D 21/152 |
| JP | 8-85473 | | | 4/1996 | | |

(Continued)

*Primary Examiner* — Dennis H Pedder
(74) *Attorney, Agent, or Firm* — Oblon, McClelland, Maier & Neustadt, L.L.P.

(57) ABSTRACT

A vehicle front portion structure has: a suspension member provided at a vehicle lower side of side members and supported by the side members, the suspension member having a main body portion that extends in a vehicle transverse direction, and a pair of left and right arm portions, each of which extends toward a vehicle front side from a vehicle transverse direction end portion of the main body portion; a front cross member connecting a distal end portion of one of the arm portions and a distal end portion of another of the arm portions in the vehicle transverse direction; and a pair of left and right braces extending obliquely toward vehicle transverse direction outer sides while heading toward a vehicle rear side, front end portions of the braces being joined to the front cross member, and rear end portions of the braces being joined to the arm portions.

8 Claims, 3 Drawing Sheets

(56) References Cited

U.S. PATENT DOCUMENTS

| | | | | |
|---|---|---|---|---|
| 2013/0193660 A1* | 8/2013 | Ramsey | ................ | B60G 99/00 |
| | | | | 280/124.1 |
| 2014/0110925 A1* | 4/2014 | Goellner | ............. | B62D 21/155 |
| | | | | 280/781 |
| 2014/0360798 A1 | 12/2014 | Ghislieri et al. | | |
| 2015/0021115 A1* | 1/2015 | Komiya | ............... | B62D 21/155 |
| | | | | 180/312 |

FOREIGN PATENT DOCUMENTS

| | | |
|---|---|---|
| JP | 8-164758 A | 6/1996 |
| JP | 9-11932 A | 1/1997 |
| JP | 2002-120755 A | 4/2002 |
| JP | 2009-137543 A | 6/2009 |
| JP | 2012-6545 | 1/2012 |

* cited by examiner

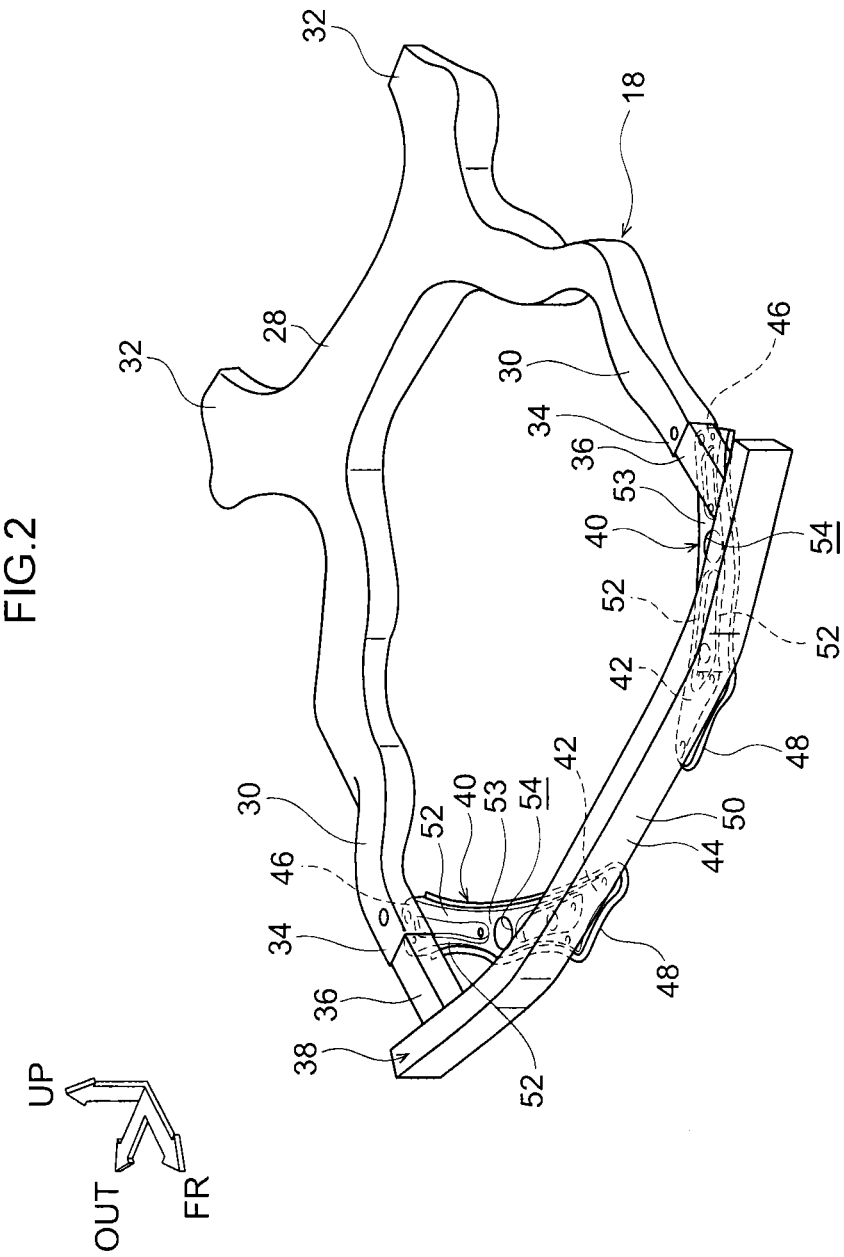

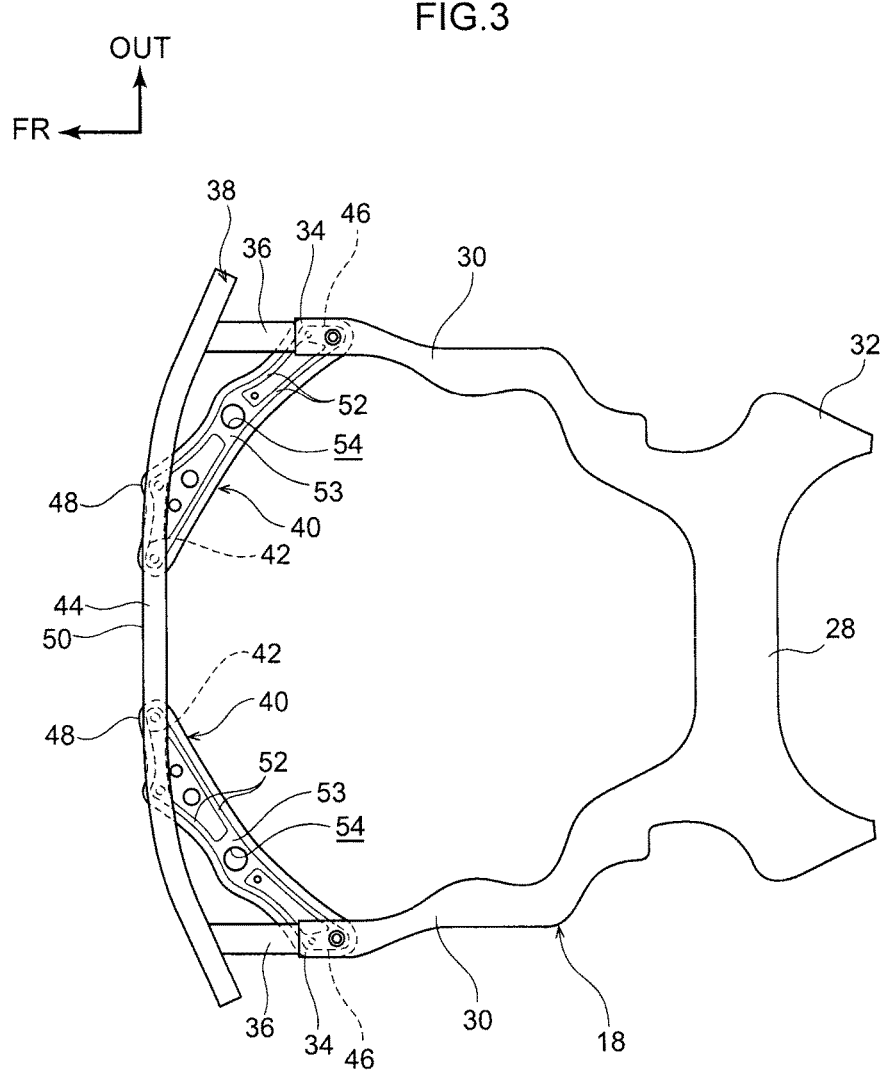

VEHICLE FRONT PORTION STRUCTURE

CROSS-REFERENCE TO RELATED APPLICATION

This application claims priority under 35 USC 119 from Japanese Patent Application No. 2015-161210 filed Aug. 18, 2015, the disclosure of which is incorporated by reference herein.

BACKGROUND

Technical Field

The present invention relates to a vehicle front portion structure.

Related Art

A vehicle front portion structure is disclosed in Japanese Patent Application Laid-Open (JP-A) No. 2012-6545. Concretely, the vehicle front portion structure has a pair of left and right front side frames that extend in the vehicle longitudinal direction at the vehicle body front portion, and a suspension member that is mounted to the front side frames. The suspension member has a pair of left and right longitudinal members that extend in the vehicle longitudinal direction, and crash cans are joined to the front end portions of these longitudinal members respectively. Further, a front cross member that extends in the vehicle transverse direction is joined to the vehicle front portions of the longitudinal members and to the vehicle rear sides of the crash cans. Due thereto, the respective left and right longitudinal members are connected in the vehicle transverse direction. Accordingly, the bending rigidity of the suspension member itself is improved, and some of the collision load is absorbed due to the crash cans being crushed and deforming at the time of a front collision of the vehicle (hereinafter called "at the time of a front collision").

In accordance with the structure disclosed in JP-A No. 2012-6545, the suspension member is formed in a substantial frame shape as seen in a vehicle plan view. Accordingly, the collision load that is applied toward the vehicle rear side at the time of a front collision is applied to the front cross member from the crash cans, and is transmitted to the longitudinal members, and, due thereto, the collision load is absorbed and the collision performance is improved. However, there is room for further improvement in further improving the bending rigidity of the suspension member and in improving the collision performance.

SUMMARY

In view of the above-described issue, the present invention provides a vehicle front portion structure that improves the bending rigidity of a suspension member and improves the collision performance.

A vehicle front portion structure of a first aspect of the present invention has: a suspension member that is provided at a vehicle lower side of side members of a vehicle and that is supported by the side members, the suspension member having a main body portion that extends in a vehicle transverse direction, and a pair of left and right arm portions, each of which extends toward a vehicle front side from a vehicle transverse direction end portion of the main body portion; a front cross member that connects a distal end portion of one of the arm portions and a distal end portion of another of the arm portions in the vehicle transverse direction; and a pair of left and right braces that extend obliquely toward vehicle transverse direction outer sides while heading toward a vehicle rear side, front end portions of the braces being joined to the front cross member, and rear end portions of the braces being joined to the arm portions.

In accordance with the first aspect, the distal end portion of one arm portion of the suspension member and the distal end portion of the other arm portion are connected in the vehicle transverse direction by the front cross member. Namely, the suspension member, including the front cross member, is formed in a substantial frame shape as seen in a vehicle plan view. Further, the arm portions of the suspension member and the front cross member are joined also by the pair of left and right braces. These braces extend obliquely toward the vehicle transverse direction outer sides while heading toward the vehicle rear side. The front end portions of the braces are joined to the front cross member, and the rear end portions of the braces are joined to the arm portions of the suspension member. Namely, as seen in a vehicle plan view, the front cross member, the arm portions, and the braces are connected in triangular shapes as a pair at the left and the right. Owing to these regions that are connected in triangular shapes, the vehicle front side portion of the suspension member is hard to deform, and the bending rigidity is improved.

Further, the collision load, that is inputted to the front cross member from the vehicle front side at the time of a front collision, is transmitted to the arm portions of the suspension member to which the front cross member is joined. However, the collision load can be transmitted to the arm portions of the suspension member also via the braces, and not only via the regions where the front cross member and the arm portions of the suspension members are directly joined. Accordingly, the collision load at the time of a front collision can be efficiently transmitted toward the vehicle rear side, and the collision load can be absorbed.

In a vehicle front portion structure of a second aspect of the present invention, in the first aspect, beads are formed at the braces along extending directions of the braces.

In accordance with the second aspect, the beads, that extend in the extending directions of the braces, i.e., obliquely toward the vehicle transverse direction outer sides while heading toward the vehicle rear side, are formed at the braces. Accordingly, the yield strength with respect to the collision load that is inputted along the extending directions of the braces is improved, and therefore, the collision load that is inputted to the front cross member can be efficiently transmitted to the arm portions of the suspension member via the braces. Namely, the bending rigidity of the suspension member can be improved, and the collision performance can be improved more.

In a vehicle front portion structure of a third aspect of the present invention, in the first aspect or the second aspect, front edges of the braces are formed along a front surface of the front cross member.

In accordance with the third aspect, because the front edges of the braces are formed along the front surface of the front cross member, the collision load that is inputted to the front cross member can be more efficiently transmitted to the braces. Namely, as an example, in a case in which the front edges of the braces are further toward the vehicle rear side than the front surface of the front cross member, the collision load that is inputted to the front cross member at the time of a front collision passes from the front cross member through the points where the braces and the front cross member are joined, and is transmitted to the braces. In contrast, due to the front edges of the braces being formed along the front surface of the front cross member, the collision load that is inputted at the time of a front collision passes-through not only the points where the braces and the front cross member are joined, but also through the front edges at places other than these points of joining, and is transmitted to the braces. Namely, the regions that transmit load to the braces are made to be large. Accordingly, collision load can be transmitted more efficiently from the front cross member via the braces to the arm portions of the suspension member. Namely, the bending rigidity of the suspension member is improved, and the collision performance can be improved even more.

In a vehicle front portion structure of a fourth aspect of the present invention, in any one of the first through third aspects, the pair of left and right braces support a vehicle lower side portion of a radiator that is provided at a vehicle front portion.

In accordance with the fourth aspect, because the pair of left and right braces support the vehicle lower side portion of the radiator, supporting of the vehicle lower side portion of the radiator by separate parts is unnecessary. Namely, generally, the radiator is supported by the radiator support, but the radiator support that supports this radiator does not have to support the vehicle lower side portion of the radiator. Namely, a part (the radiator support lower) of the radiator support can be eliminated. Further, because the radiator is supported at regions where the bending rigidity of the suspension member is improved, the generation of noise that is due to the radiator vibrating can be suppressed. Accordingly, a reduction in the manufacturing cost and an improvement in the NV performance (the noise and vibration performance) can both be achieved.

BRIEF DESCRIPTION OF THE DRAWINGS

Exemplary embodiments of the present invention will be described in detail based on the following figures, wherein:

FIG. 2 is a perspective view showing a suspension member that is equipped with the vehicle front portion structure relating to the embodiment; and FIG. 3 is a plan view showing the suspension member that is equipped with the vehicle front portion structure relating to the embodiment.

DETAILED DESCRIPTION

Figure 1:
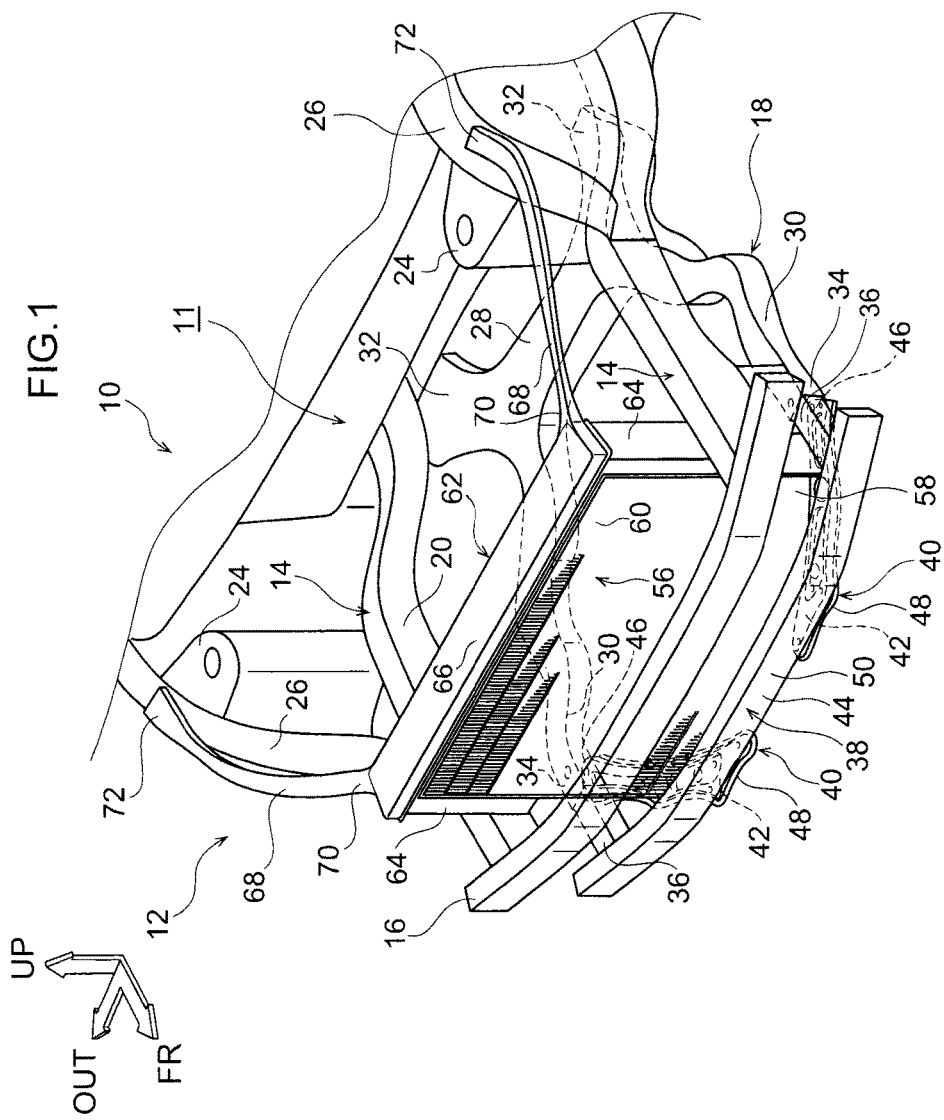
FIG. 1 is a perspective view showing a vehicle front portion that is equipped with a vehicle front portion structure relating to an embodiment.

An embodiment of a vehicle front portion structure relating to the present invention is described hereinafter by using FIGS. 1 through 3. Note that arrow FR that is shown in these drawings indicates the vehicle longitudinal direction front side, arrow OUT indicates a vehicle transverse direction outer side, and arrow UP indicates the vehicle vertical direction upper side.

As shown in FIG. 1, an engine room 11 in which an unillustrated engine unit is accommodated is provided at a front portion 12 of a vehicle 10. Front side members 14, that serve as a pair of left and right side members and that are disposed with an interval therebetween in the vehicle transverse direction and that extend in the vehicle longitudinal direction, and a bumper reinforcement 16 that is mounted to the front end portions of the pair of left and right front side members 14, are provided at the interior of this engine room 11. Further, the front portion 12 of the vehicle 10 has a suspension member 18 to which unillustrated suspension arms and a steering gear box and the like are mounted.

The front side member 14 that is disposed at a vehicle transverse direction one side (the right side) and the front side member 14 that is disposed at the vehicle transverse direction other side (the left side) are formed so as to be symmetrical in the vehicle transverse direction. The cross-sections, that are cut along the vehicle transverse direction, of the pair of left and right front side members 14 are formed in rectangular shapes. Further, as an example, the front side member 14 is formed by an inner panel 20, that is disposed at the vehicle transverse direction inner side and extends along the longitudinal direction, and an outer panel 22, that is disposed at the vehicle transverse direction outer side of the inner panel 20 and extends along the longitudinal direction, being joined together. The engine unit that is not illustrated is supported at the above-described front side members 14 via engine unit mounts. Further, wheel house inners 26, at which are formed suspension towers 24 at which the upper end portions of unillustrated coilovers are supported, are joined to the front side member 14 at the right side and the front side member 14 at the left side, respectively.

The cross-section, that is cut along the vehicle longitudinal direction, of the bumper reinforcement 16 is formed in a substantially rectangular shape, and the bumper reinforcement 16 extends at the interior of an unillustrated bumper cover with the vehicle transverse direction being the length direction of the bumper reinforcement 16. Further, the bumper reinforcement 16 is mounted to the front end portions of the front side members 14 via unillustrated crash boxes. Due thereto, the front end portion of the front side member 14 at the right side and the front end portion of the front side member 14 at the left side are connected in the vehicle transverse direction by the bumper reinforcement 16.

The suspension member 18 is disposed at the vehicle lower side of the front side members 14, and is supported by the front side members 14. As shown in FIG. 2, the suspension member 18 is formed in a substantial H-shape as seen in a vehicle plan view. Concretely, the suspension member 18 has a main body portion 28 that extends in the vehicle transverse direction, and a pair of left and right arm portions 30 that extend toward the vehicle front side from the both vehicle transverse direction end portions of the main body portion 28 respectively. Note that, in the present embodiment, the suspension member 18 is structured from iron as an example, but is not limited to this and may be structured from another metal such as an aluminum alloy or the like.

The arm portion 30 at the right side and the arm portion 30 at the left side are formed so as to be symmetrical in the vehicle transverse direction. Further, rear side extension portions 32, that extend further toward the vehicle rear side than the main body portion 28, are formed further toward the vehicle rear side than the main body portion 28 at the arm portions 30 respectively. The rear side extension portions 32 of the arm portions 30 are supported via unillustrated bolts or the like at vehicle rear side regions of the front side members 14.

A front cross member 38 is provided, via connecting portions 36, at distal end portions 34 of the arm portions 30 of the suspension member 18. The cross-section, that is cut along the vehicle longitudinal direction, of the front cross member 38 is formed to be substantially rectangular, and the front cross member 38 extends with the vehicle transverse direction being the length direction thereof. Note that the connecting portions 36 extend with the substantially vehicle longitudinal direction being the length directions thereof. One end portion of the connecting portion 36 is joined by welding or the like to the distal end portion 34 of the arm portion 30, and the other end portion of the connecting portion 36 is joined by welding or the like to the vehicle rear side surface of the front cross member 38. Further, the "arm portion" of the present invention is structured by the connecting portion 36 and the arm portion 30.

Braces 40 are respectively provided between the front cross member 38 and the distal end portion 34 of the arm portion 30 that is disposed at a vehicle transverse direction one side (the right side), and between the front cross member 38 and the distal end end portion 34 of the arm portion 30 that is disposed at the vehicle transverse direction other side (the left side). As shown in FIG. 3, the brace 40 is formed in a substantially rectangular shape as seen in a vehicle plan view, and a front end portion 42 is joined by welding to the vehicle lower side surface of a central portion 44 of the front cross member 38, and a rear end portion 46 is joined by welding to the vehicle lower side surface of the distal end portion 34 of the arm portion 30. Namely, the brace 40 extends at an incline toward the vehicle transverse direction outer side while heading toward the vehicle rear side. Further, although not illustrated, the cross-section, that is orthogonal to the length direction (the extending direction) of the brace 40, of the brace 40 is formed in a substantial U-shape that opens toward the vehicle lower side. Note that the brace 40 that is disposed at a vehicle transverse direction one side (the right side) and the brace 40 that is disposed at the vehicle transverse direction other side (the left side) are formed so as to be symmetrical in the vehicle transverse direction.

Front edges 48 of the braces 40 are formed along a front surface 50 of the front cross member 38. Namely, as seen in a vehicle plan view, the front edges 48 of the braces 40 and the front surface 50 of the front cross member 38 are structured so as to substantially overlap. Note that the front edges 48 of the braces 40 may protrude-out slightly further toward the vehicle front side than the front surface 50 of the front cross member 38. The present embodiment is structured such that the front edges 48 of the braces 40 protrude-out slightly further toward the vehicle front side than the front surface 50 of the front cross member 38.

Beads 52 and a radiator mounting hole 54 are formed at the brace 40. The beads 52 project-out toward the vehicle upper side and extend along the length direction (the extending direction) of the brace 40. Namely, the beads 52 extend toward the vehicle transverse direction outer side while heading toward the vehicle rear side. Note that the beads 52 are formed along the short-length direction both end portions of the brace 40, respectively. Further, the beads 52, that are provided at the short-length direction both end portions of the brace 40 respectively, are connected by a bead connecting portion 53 that is formed at the substantially central portion in the length direction of the brace 40. The vehicle upper side surface of this bead connecting portion 53 is disposed in substantially the same plane as the vehicle upper side surfaces of the beads 52. Namely, the heights, in the vehicle vertical direction, of the vehicle upper side surface of the bead connecting portion 53 and the vehicle upper side surfaces of the beads 52 are substantially the same.

The radiator mounting hole 54 is formed in a circular shape as seen in a vehicle plan view, and is formed in the substantially central portion in the length direction of the brace 40 so as to pass-through the brace 40 in the plate thickness direction. An unillustrated anchor portion, that is formed at a vehicle lower side portion 58 of a radiator 56 illustrated in FIG. 1, is anchored to this radiator mounting hole 54. Accordingly, the vehicle lower side portion 58 of the radiator 56 is supported by the braces 40.

A radiator support 62 is provided at a vehicle upper side portion 60 of the radiator 56. This radiator support 62 is formed in an upside-down U-shape as seen in a vehicle front view, by radiator support side portions 64 that are disposed at the both vehicle transverse direction outer sides of the radiator 56 respectively and that are joined to the front side members 14, and a radiator support upper portion 66 that is disposed at the vehicle upper side of the radiator 56. Further, radiator support supporting members 68 are mounted to the both vehicle transverse direction end portions of the radiator support 62, respectively. These radiator support supporting members 68 extend with the substantially vehicle longitudinal direction being the length directions thereof, and end portions 70 at the vehicle front sides thereof are joined to the vehicle transverse direction end portions of the radiator support upper portion 66 as an example, and end portions 72 at the vehicle rear sides thereof are joined to the wheel house inners 26. Due thereto, the vehicle upper side portion 60 of the radiator 56 is supported at the vehicle body via the radiator support 62.

Operation and effects of the present embodiment are described next.

In the present embodiment, as shown in FIG. 2, the distal end portion 34 of one of the arm portions 30 of the suspension member 18 and the distal end portion 34 of the other arm portion 30 are connected in the vehicle transverse direction by the front cross member 38 via the connecting portions 36. Namely, the suspension member 18, including the front cross member 38, is formed in a substantial frame shape as seen in a vehicle plan view. Further, the arm portions 30 of the suspension member 18 and the front cross member 38 are joined also by the pair of left and right braces 40. The braces 40 extend obliquely toward the vehicle transverse direction outer sides while heading toward the vehicle rear side, and the front end portions 42 thereof are joined to the front cross member 38, and the rear end portions 46 thereof are joined to the arm portions 30 of the suspension member 18. Namely, as seen in a vehicle plan view, the front cross member 38, the arm portions 30, and the braces 40 are connected in triangular shapes as a pair at the left and the right. Owing to these regions that are connected in triangular shapes, the vehicle front side portion of the suspension member 18 is hard to deform, and the bending rigidity thereof improves.

Further, the collision load, that is inputted to the front cross member 38 from the vehicle front at the time of a front collision, is transmitted to the arm portions 30 of the suspension member 18 to which the front cross member 38 is joined. However, the collision load can be transmitted to the arm portions 30 of the suspension member 18 also via the braces 40, and not only via the regions where the front cross member 38 and the arm portions 30 of the suspension members 18 are directly joined. Accordingly, the collision load at the time of a front collision can be efficiently transmitted toward the vehicle rear side, and the collision load can be absorbed. Due thereto, the bending rigidity of the suspension member 18 can be improved, and the collision performance can be improved.

Moreover, the beads 52, that extend in the extending directions of the braces 40, i.e., obliquely toward the vehicle transverse direction outer sides while heading toward the vehicle rear side, are formed at the braces 40. Accordingly, the yield strength with respect to the collision load that is inputted along the extending directions of the braces 40 improves, and therefore, the collision load that is inputted to the front cross member 38 can be efficiently transmitted to the arm portions 30 of the suspension member 18 via the braces 40. Due thereto, the bending rigidity of the suspension member 18 can be improved, and the collision performance can be improved more.

Still further, because the front edges 48 of the braces 40 are formed along the front surface 50 of the front cross member 38, the collision load that is inputted to the front cross member 38 can be more efficiently transmitted to the braces 40. Namely, as an example, in a case in which the front edges 48 of the braces 40 are further toward the vehicle rear side than the front surface 50 of the front cross member 38, the collision load that is inputted to the front cross member 38 at the time of a front collision passes from the front cross member 38 through the points where the braces 40 and the front cross member 38 are joined, and is transmitted to the braces 40. In contrast, due to the front edges 48 of the braces 40 being formed along the front surface 50 of the front cross member 38, the collision load that is inputted at the time of a front collision passes-through not only the points where the braces 40 and the front cross member 38 are joined, but also through the front edges 48 at places other than these points of joining, and is transmitted to the braces 40. Namely, the regions that transmit load to the braces 40 are made to be large. Accordingly, collision load can be transmitted more efficiently from the front cross member 38 via the braces 40 to the arm portions 30 of the suspension member 18.

Further, because the pair of left and right braces 40 support the vehicle lower side portion 58 of the radiator 56, supporting of the vehicle lower side portion 58 of the radiator 56 by separate parts is unnecessary. Namely, generally, the radiator 56 is supported by the radiator support 62, but the radiator support 62 that supports this radiator 56 does not have to support the vehicle lower side portion 58 of the radiator 56. Namely, a part (the radiator support lower) of the radiator support 62 can be eliminated. Moreover, because the radiator 56 is supported at regions where the bending rigidity of the suspension member 18 is improved, the generation of noise that is due to the radiator 56 vibrating can be suppressed. Due thereto, a reduction in the manufacturing cost and an improvement in the NV performance can both be achieved.

Further, because the vehicle lower side portion 58 of the radiator 56 is supported by the braces 40, the radiator 56 can be installed into the engine room 11 of the vehicle 10 at the same time as the unillustrated engine unit. Generally, the radiator 56 is supported by a radiator support that is formed in a substantial frame shape. Therefore, at the time of mounting the radiator 56 within the engine room 11, in order to fit the radiator 56 into the substantially frame-shaped radiator support, the radiator support upper portion of the radiator support is temporarily removed, and the assembly work is carried out from the vehicle front side. Namely, the direction in which the radiator 56 is assembled-in is different from that of the engine unit that is installed into the engine room 11 from the vehicle upper side, and therefore, the radiator 56 cannot be installed into the engine room 11 at the same time as the engine unit. Accordingly, the engine unit and the radiator 56 are installed into the engine room 11 in separate processes, and thereafter, the work of laying the pipes that connect the engine unit and the radiator 56 must be carried out. A worker must carry out this pipe laying work from the vehicle lower side of the vehicle 10, and therefore, the assembly workability deteriorates.

In contrast, in the present embodiment, because the vehicle lower side portion 58 of the radiator 56 is supported by the braces 40, the radiator 56 can be assembled into the engine room 11 by being placed on the braces 40 from the vehicle upper side. Namely, the radiator 56 can be installed into the engine room 11 from the vehicle upper side in the same way as the engine unit. Therefore, after the pipes are laid and the engine unit and the radiator 56 are connected in advance at a place separate from the assembly line, the engine unit and the radiator 56 are integrally installed into the engine room 11. Thereafter, the radiator 56 is held within the engine room 11 by mounting the radiator support 62, that is formed in an upside-down U-shape as seen in a vehicle front view, to the radiator 56 and the front side members 14 from the vehicle upper side of the radiator 56. Namely, work for laying pipes from the vehicle lower side of the vehicle 10 in order to connect the engine unit and the radiator 56 becomes unnecessary. Due thereto, the assembly workability can be improved.

Note that, in the present embodiment, the braces 40 are joined by welding to the front cross member 38 and the front side members 14. However, the braces 40 are not limited to this, and may be structured so as to be fastened by fasteners such as bolts or the like.

Further, the cross-section, that is orthogonal to the length direction of the brace 40, of the brace 40 is made to be a substantial U-shape that opens toward the vehicle lower side. Namely, the brace 40 is made to be an open cross-sectional shape. However, the brace 40 is not limited to this, and, by forming the brace in the shape of a box for example, the cross-section, that is orthogonal to the length direction, of the brace 40 may be made to be a closed cross-sectional shape.

Moreover, the present embodiment is structured such that the braces 40 that are separate bodies are mounted to the suspension member 18 and the front cross member 38. However, the braces 40 are not limited to this, and there may be a structure in which the braces 40 are formed integrally with the distal end portions 34 of the arm portions 30 of the suspension member 18.

Still further, although the beads 52 are formed at the braces 40, the braces 40 are not limited to this and may be structured such that the beads 52 are not formed thereat.

Further, although the front edges 48 of the braces 40 are formed along the front surface 50 of the front cross member 38, the front edges 48 are not limited to this and do not have to run along the front surface 50 of the front cross member 38.

Although an embodiment of the present invention has been described above, the present invention is not limited to the above, and can, of course, be implemented by being modified in various ways other than the above within a scope that does not depart from the gist thereof.

What is claimed is:

1. A vehicle front portion structure comprising:
   a suspension member that is provided at a vehicle lower side of side members of a vehicle and that is supported by the side members, the suspension member having a main body portion that extends in a vehicle transverse direction, and a pair of left and right arm portions, each of which extends toward a vehicle front side from respective vehicle transverse direction end portions of the main body portion, and the suspension member is supported by the side members at a pair of left and right rear side extension portions of the arm portions;
   a front cross member that connects a distal end portion of one of the arm portions and a distal end portion of another of the arm portions in the vehicle transverse direction, and that is formed in a convex shape toward a vehicle front direction and is formed in a vehicle front side of a radiator such that a collision load from a vehicle front side is inputted thereto at a time of a front collision; and a pair of left and right braces that extend obliquely toward vehicle transverse direction outer sides while heading toward the vehicle rear side, front end portions of the braces being joined to the front cross member, and rear end portions of the braces being joined to the arm portions.

2. The vehicle front portion structure of claim 1, wherein beads are formed at the braces along extending directions of the braces.

3. The vehicle front portion structure of claim 1, wherein front edges of the braces are formed along a front surface of the front cross member.

4. The vehicle front portion structure of claim 1, wherein the pair of left and right braces support a vehicle lower side portion of a radiator that is provided at a vehicle front portion.

5. The vehicle front portion structure of claim 1, wherein the side portions extend in a longitudinal direction of the vehicle and are spaced from each other by an interval in the transverse direction of the vehicle.

6. The vehicle front portion structure of claim 1, wherein the rear side extension portions are portions of the arm portions that extend further toward the vehicle rear side than the main body portion.

7. The vehicle front portion structure of claim 1, wherein the collision load from the vehicle front side is transferred from the front cross member to the arm portions via the distal end portions of the arm portions and the pair of left and right braces.

8. The vehicle front portion structure of claim 1, wherein the front cross member crosses a front face of the radiator.

* * * * *